(12) United States Patent
Laros et al.

(10) Patent No.: US 7,988,865 B2
(45) Date of Patent: Aug. 2, 2011

(54) FEEDWELL DILUTION SYSTEM FOR THICKENERS IN OIL SANDS

(75) Inventors: Timothy J. Laros, Park City, UT (US); Frank Andrew Baczek, Holladay, UT (US)

(73) Assignee: FLSmidth A/S, Valby (DK)

( * ) Notice: Subject to any disclaimer, the term of this patent is extended or adjusted under 35 U.S.C. 154(b) by 62 days.

(21) Appl. No.: 12/631,766

(22) Filed: Dec. 4, 2009

(65) Prior Publication Data

US 2011/0132846 A1 Jun. 9, 2011

(51) Int. Cl.
*B01D 21/24* (2006.01)

(52) U.S. Cl. ........ 210/712; 210/800; 210/805; 210/194; 210/519; 210/541

(58) Field of Classification Search .................. 210/702, 210/712, 800, 801, 805, 194, 519, 528, 541
See application file for complete search history.

(56) References Cited

U.S. PATENT DOCUMENTS

| | | | | |
|---|---|---|---|---|
| 3,006,474 A | * | 10/1961 | Fitch | 210/801 |
| 3,485,365 A | * | 12/1969 | Keller | 210/528 |
| 3,731,811 A | * | 5/1973 | Gustavsson | 210/194 |
| 3,994,808 A | * | 11/1976 | Kearney | 210/519 |
| 4,274,958 A | * | 6/1981 | Fitch | 210/519 |
| 4,376,045 A | * | 3/1983 | Siskind | 210/519 |
| 5,015,392 A | | 5/1991 | Taylor | |
| 5,147,556 A | | 9/1992 | Taylor | |
| 5,389,250 A | | 2/1995 | Wood et al. | |
| 5,944,995 A | * | 8/1999 | Sethi et al. | 210/519 |
| 6,966,985 B2 | | 11/2005 | Schoenbrunn et al. | |
| 7,520,995 B2 | | 4/2009 | Taylor et al. | |
| 7,547,396 B2 | | 6/2009 | Foreman et al. | |
| 7,569,137 B2 | | 8/2009 | Hyndman et al. | |
| 2005/0115907 A1 | * | 6/2005 | Taylor | 210/702 |
| 2005/0155917 A1 | * | 7/2005 | Taylor et al. | 210/97 |
| 2008/0190817 A1 | * | 8/2008 | Siy et al. | 208/391 |

* cited by examiner

*Primary Examiner* — Christopher Upton
(74) *Attorney, Agent, or Firm* — Aaron M. Pile; Jeffrey A. Sharp (57) ABSTRACT

A feedwell dilution system for diluting an influent feed stream, which include at least one eductor assembly, and a feedwell assembly. The at least one eductor assembly includes a feed pipe which converges to a narrow throat portion or nozzle; a mix tube positioned downstream from the narrow throat portion that is sized and configured to provide mixing of the influent feed stream and a clarified liquid drawn from a settling tank; and an enclosure, which is installed around the narrow throat portion and an inlet portion of the mix tube and includes an open-ended portion on a bottom thereof, which is sized and configured to allow a clarified liquid to be pulled into the mix tube from below the inlet portion of the mix tube. The feedwell assembly is sized and configured to receive the mixture of the influent feed stream and the clarified liquid from the mix tube.

20 Claims, 5 Drawing Sheets

FEEDWELL DILUTION SYSTEM FOR THICKENERS IN OIL SANDS

FIELD OF THE INVENTION

This application relates generally to feedwells for diluting and dispensing an influent slurry feed stream into a settling tank or basin, and more specifically to a self-diluting feedwell for diluting and dispensing an influent slurry feed stream into a thickener, clarifier, or settling tank without the need for a dilution pump or additional dilution material from an outside source, and which operates in the oil sands extraction and recovery process, including tailings treatment, and prevents stray bitumen from fouling the dilution system and feedwell.

BACKGROUND OF THE INVENTION

Slurries or suspensions comprising liquids carrying suspended particles are typically subjected to a process called clarification to separate suspended particles from supernatant liquid. Typically, clarification is accomplished by continuously feeding an influent slurry or suspension feed stream into a settling tank or thickener, where suspended particles are allowed to gravity settle and form a sludge or thickened mud on the bottom of the tank. The thickened material is removed and further processed or disposed of, while the clarified liquid supernatant is either discharged, further processed, reused, or subjected to further clarification.

A feedwell (or feedwell assembly) is often used to introduce an influent feed stream flow into the settling tank or basin, as well as to provide a means of flocculating the feed stream and of distributing the feed stream into the tank in a nonturbulent manner. Disruption of the thickened material in the tank is minimized if the flow velocity of the influent feed stream is reduced before the influent enters to the tank. Typically, a feedwell dissipates the flow velocity by directing the feed stream into a circular or rectangular compartment in the center of the settling tank or basin which is separated from the contents of the settling tank or basin. The feedwell is frequently mounted from a bridge, on a tower, column or pier in the center of the tank, but may be positioned around the perimeter of the tank or across the diameter of the tank. As the influent feed stream flows into the feedwell, much of the kinetic energy of the stream is dissipated due to the reduction in velocity head and the friction of the influent with the feedwell shelves and walls. The feedwell may also contain a series of baffles to help dissipate the kinetic energy of the influent feed stream. The relatively quiescent influent is then allowed to enter the settling tank through ports in the sides or through an open bottom of the feedwell, or by allowing it to spill over the edge of a channel or from an influent weir into the settling tank.

The sedimentation process is typically expedited by adding a flocculating reagent to the influent before it enters the settling tank. The flocculating reagent typically has a polymeric molecular structure, which agglomerates with suspended particles in the influent to form aggregate clusters called flocs. Flocs have a greater density than the discrete suspended particles, and settle to the floor of the tank in a more celeritous manner.

Several factors influence the effectiveness of flocculating reagents to agglomerate with suspended particles. The flocculating reagent must be mixed thoroughly with the influent and allowed ample time to agglomerate. If the concentration of suspended particles in the influent is low, the flocculating reagent may need to be stirred through the influent. This requires the addition of a stirring mechanism or flocculator to the settling tank. If the concentration of particles is high, the influent may need to be diluted for optimum flocculation to occur.

Dilution of an influent feed stream is currently accomplished by several methods. A pump may be employed to add a liquid, such as previously clarified liquor from the settling tank, to the influent feed stream. The feedwell sidewall can also be positioned or notched below the liquid surface of the settling tank so that previously clarified liquor spills over the side of the feedwell and into the channel, diluting the feed stream. Problems with using a pump include the added expense and maintenance of the pump and power costs for operation thereof. The main drawback of the spill method is the lack of practical means to adjust the dilution ratio.

It can be appreciated that the operation of a feedwell dilution system for thickeners in oil sands (or tar sands) can also present additional problems including accumulation of stray bitumen within the feedwell dilution system, including the feedwell (or feedwell assembly). Bitumen is typically a mixture of organic hydrocarbon liquids that are highly viscous and sticky. Oil sands, which are also known as tar sands, or extra heavy oil, are a type of bitumen deposit. The sands are naturally occurring mixtures of sand or clay, water and an extremely dense and viscous form of petroleum called bitumen. However, the operation of a feedwell dilution system in oil sands thickening applications, including tailings, can experience stray, or residual, bitumen from the extraction process, which accumulates on the surface of the thickener and can foul the dilution system and feedwell, thus lowering the dilution efficiency and flocculation of the oil sands slurry feeding the thickener.

The present invention obviates many of the problems and expenses associated with prior art methodologies for diluting and flocculating an influent feed stream by using the principles of eductive flow and eductors to thoroughly and automatically mix a dilution liquor with an influent feed stream and which also allows the accumulation of a layer of bitumen on the surface of the thickener, and to draw the dilute (or dilution liquid) from beneath the accumulation, thus keeping the dilution system from fouling with accumulated bitumen These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

In accordance with an exemplary embodiment, a feedwell dilution system for diluting an influent feed stream comprises: at least one eductor assembly, the at least one eductor assembly comprising: a feed pipe which converges to a narrow throat portion or nozzle; a mix tube positioned downstream from the narrow throat portion that is sized and configured to provide mixing of the influent feed stream and a clarified liquid drawn from a settling tank; and an enclosure, which is installed around the narrow throat portion and an inlet portion of the mix tube and includes an open-ended portion on a bottom thereof, which is sized and configured to allow a clarified liquid to be pulled into the mix tube from below the inlet portion of the mix tube; and a feedwell assembly, which is sized and configured receives the mixture of the influent feed stream and the clarified liquid from the mix tube.

In accordance with another exemplary embodiment, a system for diluting an influent feed stream entering into a settling tank, comprises: a settling tank, which is structured to provide settling of particulate material residing within an influent feed stream and facilitate the formation of a clarified liquid in an upper region thereof; a feedwell disposed in the settling tank, the feedwell having an outer wall defining an outer perimeter of the feedwell; and a pair of eductor assemblies, each of the eductor assemblies comprising: a feed pipe which converges to a narrow throat portion or nozzle; a mix tube positioned downstream from the narrow throat portion that is sized and configured to provide mixing of the influent feed stream and the clarified liquid drawn from the settling tank; and an enclosure, which is installed around the narrow throat portion of the feed pipe and an inlet portion of the mix tube and includes an open-ended portion on a bottom thereof, which is sized and configured to allow the clarified liquid to be pulled into the mix tube from below the inlet portion of the mix tube.

In accordance with a further exemplary embodiment, a method of providing an enclosure for a mix tube of an eductor assembly in a system configured to dilute an influent feed stream entering into a settling tank, comprises: directing an influent feed stream into a dilution system, which includes at least one feed pipe having a narrow throat portion, and a mix tube positioned downstream from the narrow throat portion that is sized and configured to provide mixing of the influent feed stream and a dilution liquor; installing an enclosure around the narrow throat portion of the feed pipe and an inlet portion of the mix tube, wherein the enclosure includes an open-ended portion on a bottom thereof, which is sized and configured to allow the dilution liquor to be pulled into the mix tube from below the inlet portion of the mix tube; mixing the influent feed stream with the dilution liquor by pulling the dilution liquor from below the inlet portion of the mix tube; and delivering the influent feed stream and the dilution liquor to a feedwell assembly via the mix tube.

BRIEF DESCRIPTION OF THE DRAWING

The above and other objects, features, and advantages will become more readily apparent from the following description, reference being made to the accompanying drawing in which.

DETAILED DESCRIPTION

Figure 1:
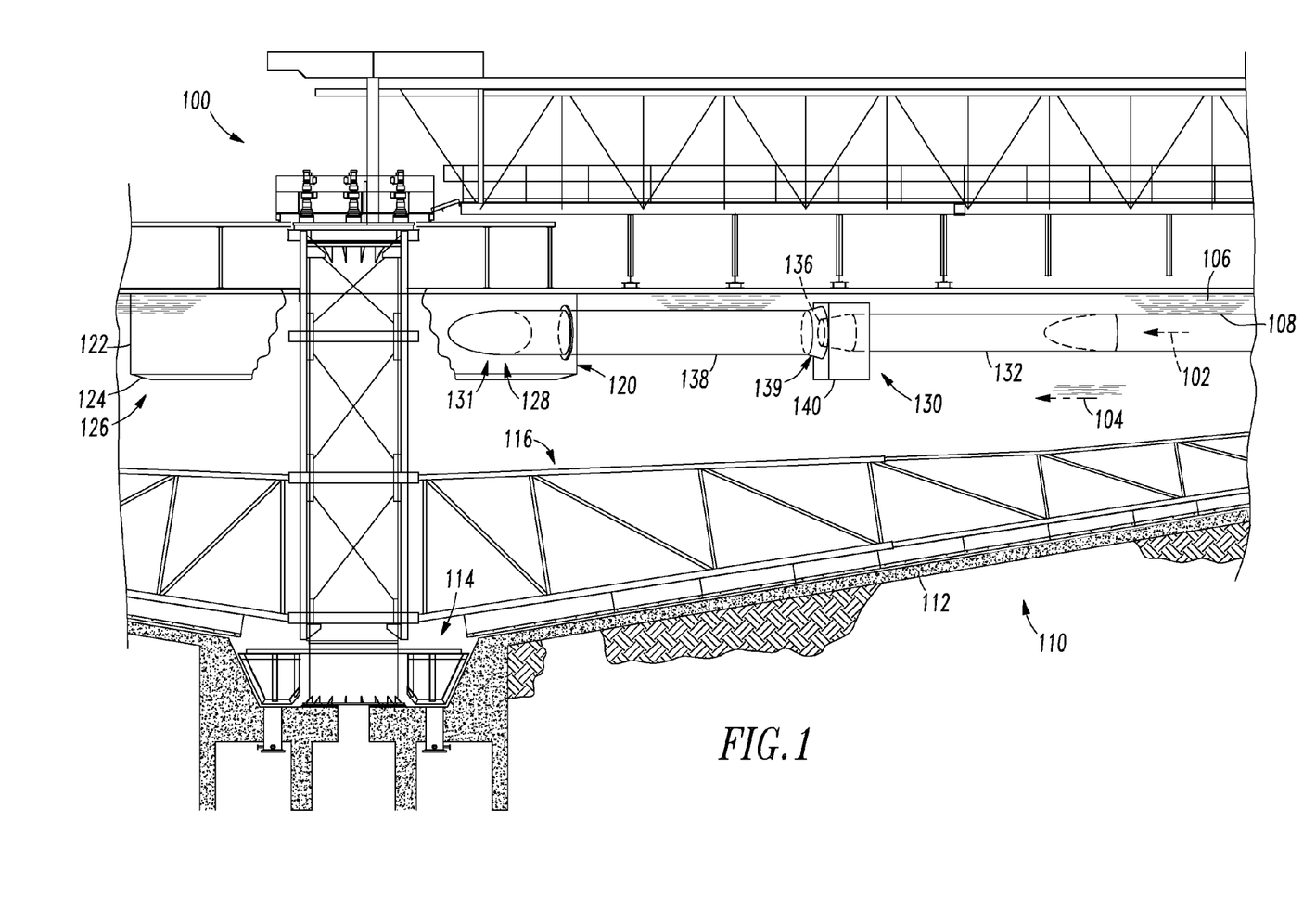
FIG. 1 is a side elevation view of a feedwell dilution system for thickeners applied in oil sands in accordance with an exemplary embodiment.

FIG. 1 is a side elevation view of a feedwell dilution system 100 for thickeners applied in oil sands in accordance with an exemplary embodiment. As shown in FIG. 1, the feedwell dilution system 100 for diluting an influent feed stream 102 comprises a settling tank 110, at least one eductor assembly 130, which delivers the influent stream 102 and diluent (i.e., dilution water, clarified liquid and/or clarified liquor) 104 to a feedwell or feedwell assembly 120.

As shown in FIG. 1, the settling tank 110 preferably includes a floor 112 and a continuous wall (not shown), which defines a volume within which the clarification process takes place. The tank 110 also includes an underflow outlet 114 for removing settled solids from the tank 110 and a fluid discharge outlet for directing clarified liquid 104 away from the tank 110. In accordance with an exemplary embodiment, the tank 110 includes a rake assembly 116 having rake arms for sweeping along the floor of the tank 110, and may include an overflow launder or bustle pipe (not shown) for collecting clarified liquid 104 near the top of the tank.

The system 100 operates by introducing an influent feed stream 102 into the volume of the tank 110 where the influent 102 is retained for a period long enough to permit the solids to settle out by gravity from the fluid. The solids that settle to the bottom of the tank 110 produce a sludge bed near the bottom of the tank 110, which is removed through the underflow outlet 114. Clarified liquid 104 is formed at or near the top of the tank 110 and is directed away from the tank for further processing or disposal. Settling of solids may be enhanced in some applications by the addition of a flocculant or polymer (not shown), or other chemical reagents, that form agglomerates that settle more readily. In many applications, an objective of fluid clarification is to enhance the settling process to achieve a high throughput of solids, and thereby enhance solids recovery.

In accordance with an exemplary embodiment, the system 100 includes a feedwell (or feedwell assembly) 120, which is centrally located within the tank 110, into which the influent feed stream 102 is delivered. The feedwell or feedwell assembly 120 is comprised of a cylindrical body 122, which reduces the fluid velocity of the incoming influent feed stream 102 so that the energy in the stream 102 may be dissipated to some degree before entering the tank 110. Dissipation of energy in the influent feed stream 102 lessens the disruptive effect that the incoming influent feed 102 has on the settling rate of the solids in the tank 110. It can be appreciated that the introduction into the tank 110 of an influent feed stream 102 under high fluid velocity tends to cause turbulence in the tank 110 and compromises the settling rate of solids. In accordance with an exemplary embodiment, the feedwell 120 is constructed to create or enhance dissipation of energy in the influent feed stream 102. For example, the feedwell 120 can be structured to introduce the influent feed stream 102 to the feedwell 120 at two opposing directions and into an annular space. As shown in FIG. 1, the feedwell 120 is generally cylindrical in shape and can include having a bottom shelf (or inner shelf) 124, which circumscribes a bottom edge 126 of the feedwell body 122. The bottom shelf (or inner shelf) 124 is angled downward to assist with the dissipation of energy in the influent feed stream 102.

Figure 2:
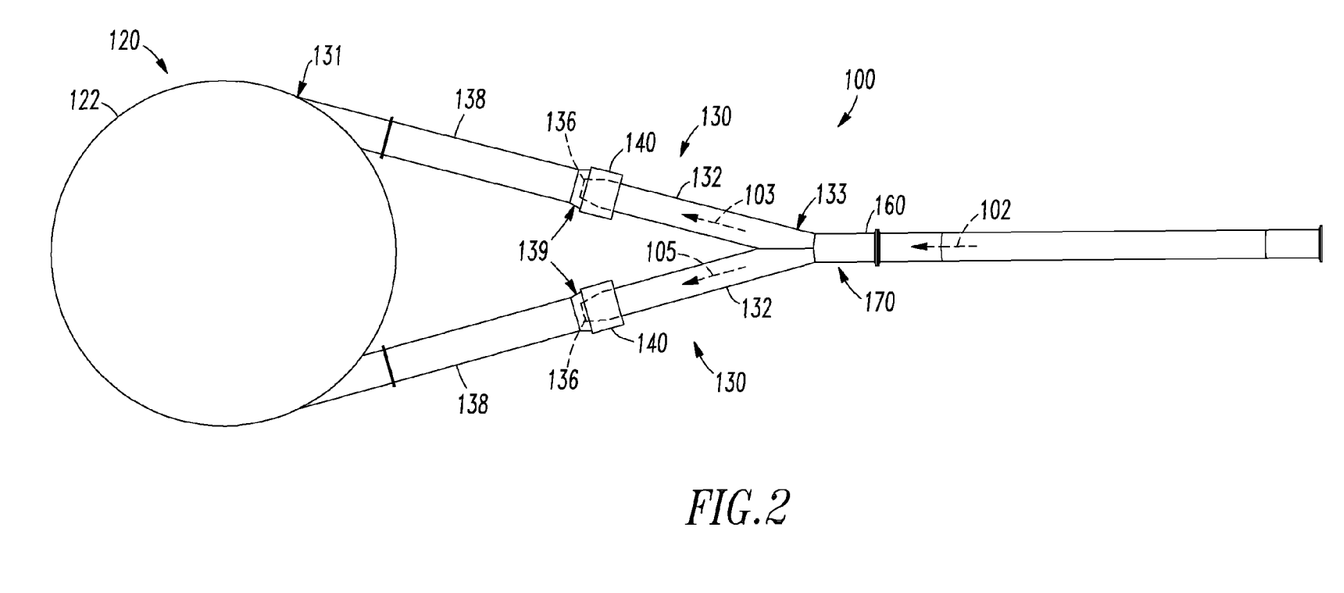
FIG. 2 is a plan view of the feedwell dilution system for thickeners applied in oil sands of FIG. 1.

The system 100 also preferably includes at least one eductor assembly 130, which is connected at a downstream end 131 to the body 122 of the feedwell assembly 120, and at an upstream end 133 (FIG. 2) to a feed launder or channel 160. Then at least one eductor assembly 130, and more preferably two eductor assemblies 130 as shown in FIG. 2, preferably extend into the feedwell body 122 on opposite sides thereof so that influent feed stream (or slurry) 102 enters the feedwell body 122 from the two eductor assemblies 130 traveling in opposed circumferential directions in vertically spaced planes.

In accordance with an exemplary embodiment, the system 100 also includes a directional nozzle 170 (FIG. 2) which directs the flow of the influent feed stream 102 into the two eductor assemblies 130 associated with the feedwell 120. The eductor assembly 130 includes an upstream feed pipe (or inlet portion) 132, which has a narrow throat portion or nozzle 136 on a downstream end thereof. It can be appreciated that the narrow throat portion or nozzle 136 of the feed pipe 132 has a reduced area (or diameter) relative to the area (or diameter) of the feed pipe 132. The narrow throat portion or nozzle 136 delivers the influent stream 102 into a mix tube 138. The mix tube 138 has an inlet portion (or receiving chamber) 139, which is positioned downstream from the narrow throat portion or nozzle 136 to provide mixing of the influent feed stream 102 and the clarified liquid (or dilution liquid or liquor) 104, which is drawn from the settling tank 110.

In accordance with an exemplary embodiment, as shown in FIG. 1, the eductor assembly 130 also includes an enclosure 140, which is installed around the narrow throat portion or nozzle 136 and the inlet portion (or receiving chamber) 139 of the mix tube 138, which allows the clarified liquid (or dilution liquid) 104 to be pulled into the receiving chamber 139 of the mix tube 138 from below an accumulated depth 108 of bitumen 106.

As shown in FIG. 1, the feed pipe 132 of the eductor assembly 130 has walls which converge in the direction of influent flow to a narrow throat portion (or nozzle portion) 136. It can be appreciated that in accordance with an exemplary embodiment, the velocity of the influent feed stream 102 increases as it travels through a directional nozzle 170 (FIG. 2) into the feed pipe 132 and through the narrow throat portion or nozzle 136 of the eductor assembly 130. The eductor assembly 130 functions to pump clarified liquid (or dilution liquid) 104 from the settling basin into the mix tube 138 to dilute the influent feed stream 102 by combining of the influent feed stream 102 and the clarified liquid (or dilution liquid) 104 into the mix tube 138.

It can be appreciated that the diluted influent feed stream 102 exits the mix tube 138 of the eductor assembly 130, and flows into a discharge zone 128 within the feedwell assembly 120. Flocculating pipes (not shown) may be located in the discharge zone 128 to add flocculating reagent to the diluted influent. The flocculated mixture stills in the discharge zone 128 and is then discharged into an open bottom portion of the feedwell 120, through which the diluted and flocculated influent is distributed into the settling tank 110.

In accordance with an exemplary embodiment, the launder or feed channel 160 is preferably connected to a header along a joint by a plurality of bolts and nuts. The launder or channel 160 can be suspended from a pair of bridge girders by cross support angles and threaded rods.

FIG. 2 is a plan view of the feedwell dilution system 100 for thickeners applied in oil sands of FIG. 1. As shown in FIG. 2, the launder of feed channel 160 contains the influent feed stream 102, which is supplied to a directional nozzle 170 which splits the influent feed stream 102 into two feed streams 103, 105 flowing in opposing directions into the feedwell 120. The two feed streams 103, 105 are directed into duplicate but contrapositioned eduction zones of the feedwell 120.

As shown in FIG. 2, the eductor assemblies 130 include a feed pipe 132, which include walls which converge in the direction of the influent flow to a narrow throat portion (or nozzle outlet) 136, and which pumps the clarified liquid (or dilution water) 104 from the tank 110 into the mix tube 138 to dilute the influent feed stream 102. The eductor assemblies 130 also include an enclosure 140, which is installed around the narrow throat portion or nozzle 136 and an inlet portion (or receiving chamber) 139 of the mix tube 138 and allows the clarified liquid or dilution water 104 to be pulled into the mix tube 138 from below an accumulated depth of bitumen. As shown in FIGS. 1 and 2, the inlet portion 139 of the mix tube 138, the narrow throat or nozzle portion 136 and the feed pipe 132 are substantially axially aligned.

Figure 3:
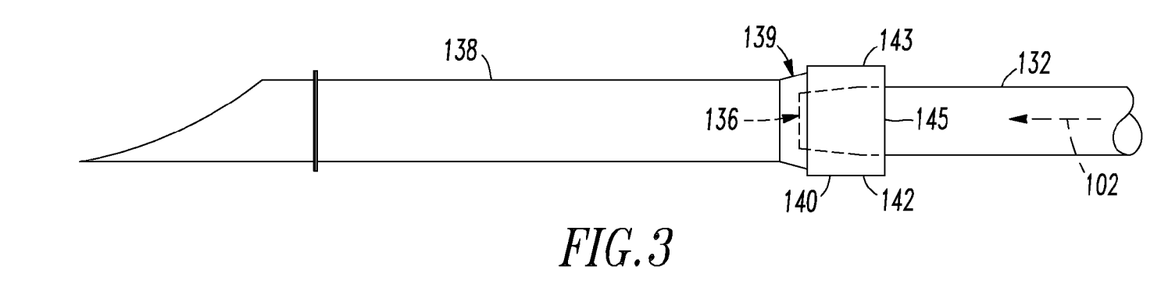
FIG. 3 is a plan view of a portion of an eductor assembly of a feedwell dilution system for thickeners applied in oil sands in accordance with an embodiment.

FIG. 3 is a plan view of a portion of an eductor assembly 130 of a feedwell dilution system 100 for thickeners applied in oil sands in accordance with an embodiment. The eductor assembly 130 includes a feed pipe 132 having a narrow throat portion or nozzle 136, and an enclosure 140, which is installed around the narrow throat portion or nozzle 136 of the feed pipe portion 132 and the inlet portion (or receiving chamber) 139 of the mix tube 138. As shown in FIG. 3, the feed pipe 132 has a narrow throat portion (or nozzle) 136 positioned proximate to the inlet portion (or receiving chamber) 139 of the mix tube 138. The narrow throat portion (or nozzle) 136 is positioned proximate to and in fluid communication with the clarified liquid (or dilution liquid) 104 in the settling tank 110 and draws the clarified liquid (or dilution liquid) 104 from a settling tank through the inlet portion (or receiving chamber) 139 of the mix tube 138 responsive to momentum transfer between the flow of the influent feed stream 102 and the clarified liquid (or dilution liquid) 104.

Figure 4:
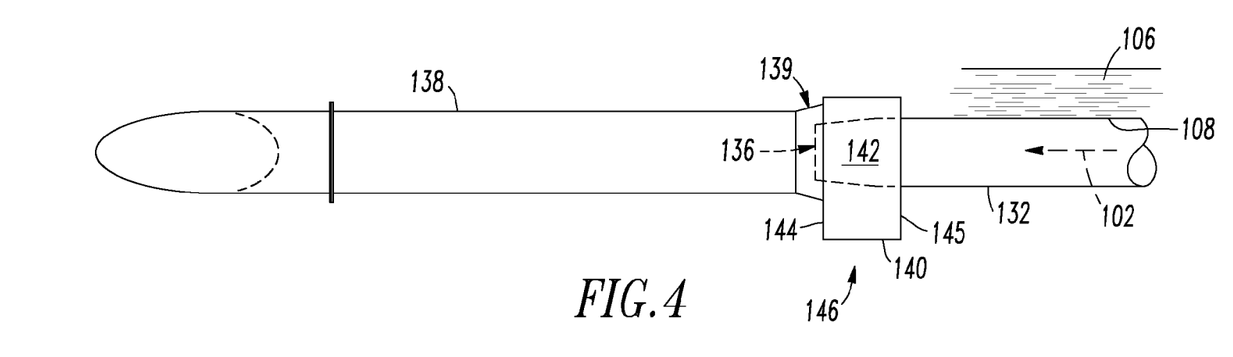
FIG. 4 is an elevation view of a portion of an eductor assembly of a feedwell dilution system for thickeners applied in oil sands of FIG. 3.

FIG. 4 is an elevation view of a portion of an eductor assembly 120 of a feedwell dilution system 100 for thickeners applied in oil sands of FIG. 3. As shown in FIG. 4, the enclosure 140 preferably includes a generally horizontal top portion 141, a pair of side walls 142, 143, extending vertically from the horizontal top portion 141, and a pair of end walls 144, 145, which are configured to accept the narrow throat portion 136 and the inlet portion 139 of the mix tube 138, respectively. The enclosure 140 also includes an open-ended bottom portion 146, which allows the clarified liquid or dilution water 104 to be pulled into the inlet portion 139 of the mix tube 138 from below an accumulated depth 108 of bitumen 106. In accordance with an exemplary embodiment, the open-ended bottom portion 146 is rectangular. For example, in accordance with an embodiment, the open-ended bottom portion 146 is square.

In accordance with an exemplary embodiment, the open-ended bottom portion 146 of the enclosure 140 is positioned between the design operating mud bed and an expectant bitumen level, such that the open-ended bottom portion 146 is at least 2 feet above the mud bed and at least 0.5 feet below the expectant bitumen level. Based on the size of the system 100, including the settling tank 110, the feedwell assembly 120, and the at least one eductor assembly 130, it can be appreciated that the position of the open-ended bottom portion 146 relative to the mud bed and the expectant bitumen level can vary.

Figure 5:
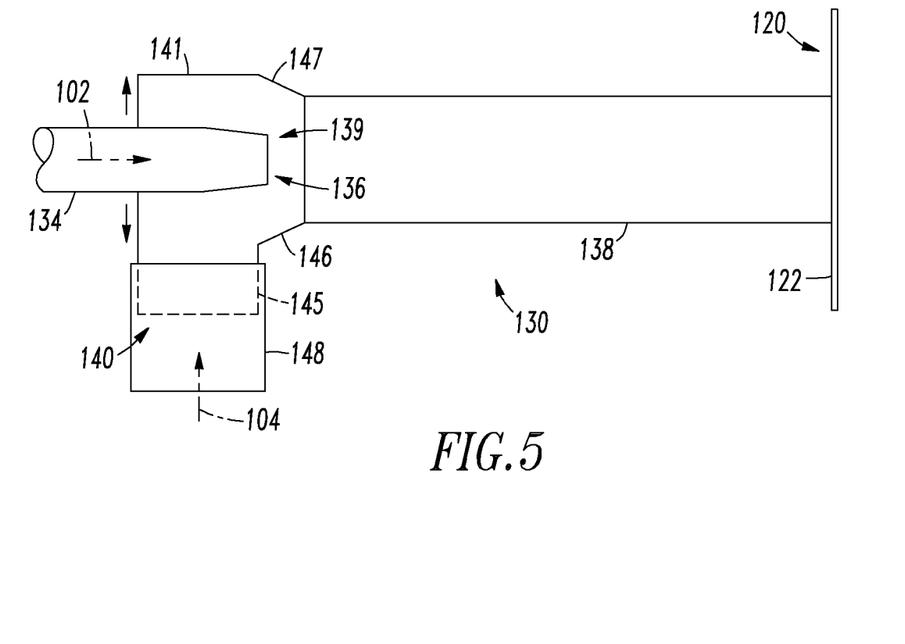
FIG. 5 is a cross-sectional view of a portion of an eductor assembly of a feedwell dilution system for thickeners applied in oil sands in accordance with an embodiment.

FIG. 5 is a cross-sectional view of a portion of an eductor assembly 130 of a feedwell dilution system 100 for thickeners applied in oil sands in accordance with an embodiment. As shown in FIG. 5, the enclosure 140 can be manufactured as part of the inlet portion (or receiving chamber) 139 of the mix tube 138. In accordance with an exemplary embodiment, the enclosure 140 is generally rectangular, however, it can be appreciated, that the enclosure 140 can also be circular and/or other configurations, which include an open-ended bottom portion 146, which allows a dilution liquid or clarified liquid 104 to be pulled into the mix tube 138 from below an accumulated depth 108 of bitumen 106.

It can be appreciated that as shown in FIG. 5, the downstream end of the enclosure 140 can include a generally vertical end wall 145 having a pair of angled walls 146, 147, which are attached to the cylindrical mix tube 138. The pair of angle walls 146, 147 assists with the combining of the influent stream 102 and the clarified liquid (or dilution water) 104 in the mix tube 138.

As shown in FIG. 5, the enclosure 140 can also be fitted with an adjustable skirt (or outer enclosure) 148, which is sized and configured to fit around the enclosure 140. The adjustable skirt 148 provides the ability to alter and/or change the distance between the open-ended bottom portion 146 of the enclosure 140, and the operating mud bed and the expectant bitumen level by moving the adjustable skirt 148 upward and/or downward relative to the open-ended bottom portion of the enclosure 140. In accordance with an exemplary embodiment, the adjustable skirt 148 can be raised and/or lowered via the bridge by a suitable device and/or system.

Figure 6:
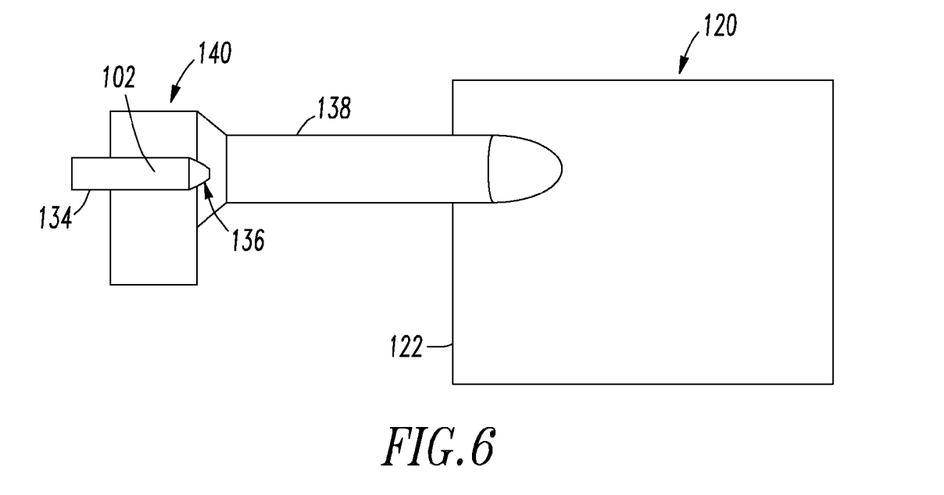
FIG. 6 is an elevation view of an eductor assembly of a feedwell dilution system for thickeners applied in oil sands in accordance with another embodiment.
Figure 7:
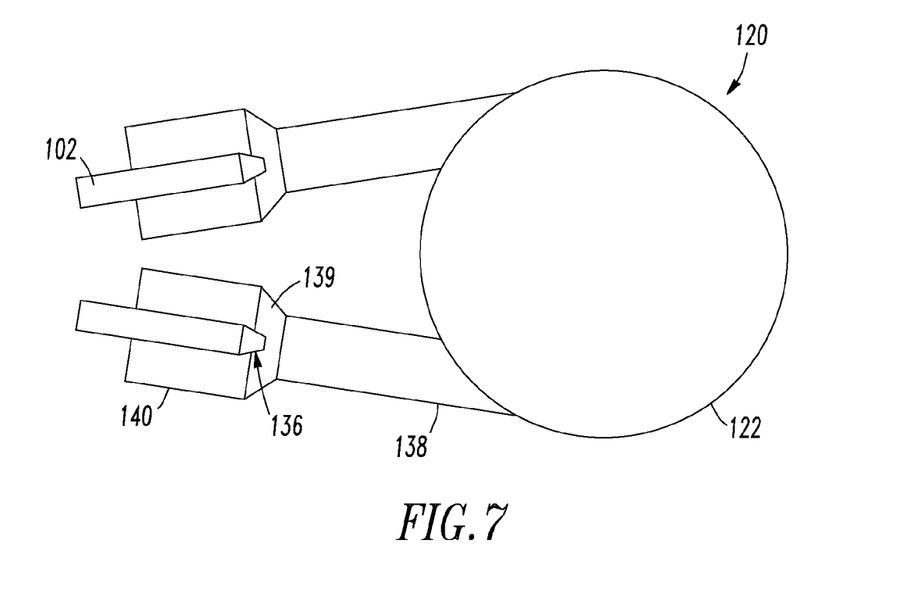
FIG. 7 is a plan view of an eductor assembly of a feedwell dilution system for thickeners applied in oil sands of FIG. 6.
Figure 8:
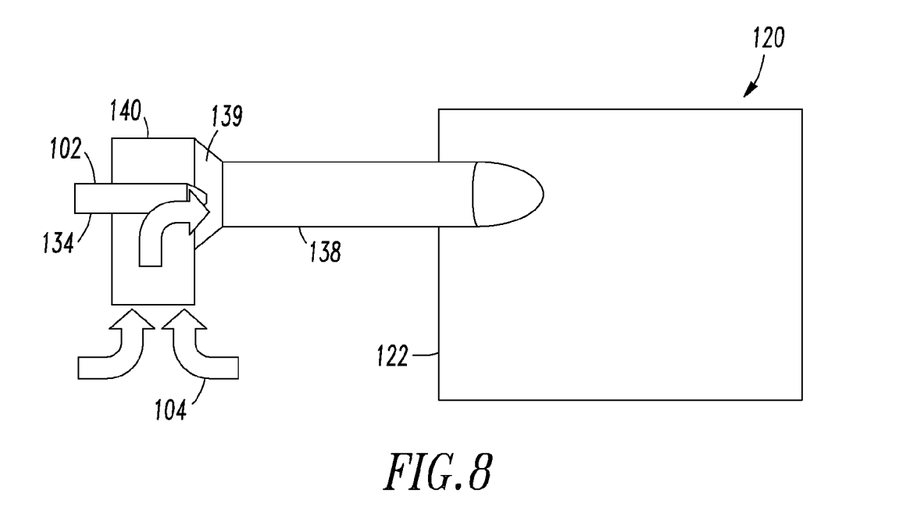
FIG. 8 is another elevation view of an eductor assembly of a feedwell dilution system for thickeners applied in oil sands of FIG. 6 showing the feedwell assembly in use.

FIGS. 6-8 are a series of views showing the eductor assembly 130 of a feedwell dilution system 100 for thickeners applied in oil sands in use. As shown in FIGS. 6-8, the narrow throat portion or nozzle 136 of the feed pipe portion 132 of the eductor assembly 130 extends into an upstream portion of the mix tube 138. In accordance with an exemplary embodiment, the eductor assembly 130 functions to pump clarified liquid 104 from the settling basin into the inlet portion (or receiving chamber) 139 of the mix tube 138 to dilute the influent feed stream 102.

A contractor or other entity may provide a dilution system such as the dilution systems shown in FIGS. 1-8. For instance, the contractor may receive a bid request for a project related to designing a system for diluting an influent feed stream or may offer to design such a system. The contractor may then provide a dilution system, such as embodiments of the dilution system discussed above. The contractor may provide such devices by selling those devices or by offering to sell those devices. The contractor may provide embodiments that are sized and configured to meet the design criteria of a client or customer. The contractor may subcontract the fabrication, delivery, sale, or installation of a component of any of the devices or of other devices to provide such devices. The contractor may also survey a site and design or designate one or more storage areas for stacking the material. The contractor may also maintain, modify or upgrade the provided devices. The contractor may provide such maintenance or modifications by subcontracting such services or by directly providing those services.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A feedwell dilution system for diluting an influent feed stream comprising:
  at least one eductor assembly, the at least one eductor assembly comprising:
    a feed pipe which converges to a narrow throat portion;
    a mix tube positioned downstream from the narrow throat portion that is sized and configured to provide mixing of the influent feed stream and a clarified liquid drawn from a settling tank; and
    an enclosure, which is installed around the narrow throat portion and an inlet portion of the mix tube and includes an open-ended portion on a bottom thereof, which is sized and configured to allow a clarified liquid to be pulled into the mix tube from below the inlet portion of the mix tube; and
  a feedwell assembly, which is sized and configured receives the mixture of the influent feed stream and the clarified liquid from the mix tube.

2. The system of claim 1, wherein the enclosure includes a generally horizontal top portion, a pair of side walls extending vertically from the horizontal top portion, a pair of end walls, which are configured to accept the narrow throat portion and the inlet portion of the mix tube, respectively, and the open-ended bottom portion.

3. The system of claim 1, wherein the at least one eductor assembly comprises a pair of eductor assemblies connected at a downstream end to the feedwell assembly at locations spaced longitudinally and circumferentially along the feedwell assembly, and at an upstream end to a feed channel.

4. The system of claim 3, further comprising a feed channel configured to deliver an influent stream to the pair of eductor assemblies.

5. The system of claim 1, wherein said throat portion comprises a directional nozzle, which directs the influent slurry stream into at least one of two eductor assemblies.

6. The system of claim 5, wherein the directional nozzle directs the influent feed stream into the mix tube of at least one of the two eductor assemblies.

7. The system of claim 1, further comprising a settling tank, which is structured to provide settling of particulate material residing within the influent feed stream and facilitate the formation of the clarified liquid in an upper region of the tank.

8. The system of claim 7, wherein the narrow throat portion of the feed pipe is positioned proximate to and in communication with the settling tank such that the narrow throat portion is sized and configured to draw clarified liquid from the settling tank through the inlet portion of the mix tube responsive to momentum transfer between a flow of the influent feed stream and the clarified liquid.

9. The system of claim 1, wherein the narrow throat structure has a reduced area relative to the feed pipe of the eductor assembly.

10. The system of claim 1, wherein the inlet of the mix tube, the narrow throat portion, and the feed pipe are substantially axially aligned.

11. The system of claim 1, further comprising an adjustable skirt, which is sized and configured to fit around the enclosure.

12. The system of claim 11, wherein the adjustable skirt provides the ability to alter and/or change the distance between the open-ended portion and an operating mud bed and an expectant bitumen level by moving the adjustable skirt upward and/or downward relative to the open-ended portion of the enclosure.

13. A system for diluting an influent feed stream entering into a settling tank, comprising:
  a settling tank, which is structured to provide settling of particulate material residing within an influent feed stream and facilitate the formation of a clarified liquid in an upper region thereof;
  a feedwell disposed in the settling tank, the feedwell having an outer wall defining an outer perimeter of the feedwell; and
  a pair of eductor assemblies, each of the eductor assemblies comprising:
    a feed pipe which converges to a narrow throat portion;

a mix tube positioned downstream from the narrow throat portion that is sized and configured to provide mixing of the influent feed stream and the clarified liquid drawn from the settling tank; and an enclosure, which is installed around the narrow throat portion of the feed pipe and an inlet portion of the mix tube and includes an open-ended portion on a bottom thereof, which is sized and configured to allow the clarified liquid to be pulled into the mix tube from below the inlet portion of the mix tube.

14. The system of claim 13, wherein the enclosure includes a generally horizontal top portion, a pair of side walls extending vertically from the horizontal top portion, a pair of end walls, which are configured to accept the narrow throat portion and the inlet portion of the mix tube, respectively, and the open-ended bottom portion.

15. The system of claim 13, wherein the eductor assemblies are connected at a downstream end to the feedwell assembly at locations spaced longitudinally and circumferentially along the feedwell assembly, and at an upstream end to a feed channel.

16. The system of claim 15, wherein the feed channel is configured to deliver an influent stream to the pair of eductor assemblies.

17. The system of claim 13, wherein said throat portion comprises a directional nozzle sized and configured to direct the influent feed stream into the feed pipe of at least one of the two eductor assemblies.

18. A method of providing an enclosure for a mix tube of an eductor assembly in a system configured to dilute an influent feed stream entering into a settling tank, comprising:

directing an influent feed stream into a dilution system, which includes at least one feed pipe having a narrow throat portion, and a mix tube positioned downstream from the narrow throat portion that is sized and configured to provide mixing of the influent feed stream and a dilution liquor;

installing an enclosure around the narrow throat portion of the feed pipe and an inlet portion of the mix tube, wherein the enclosure includes an open-ended portion on a bottom thereof, which is sized and configured to allow the dilution liquor to be pulled into the mix tube from below the inlet portion of the mix tube;

mixing the influent feed stream with the dilution liquor by pulling the dilution liquor from below the inlet portion of the mix tube; and delivering the influent feed stream and the dilution liquor to a feedwell assembly via the mix tube.

19. The method of claim 18, further comprising flocculating the influent feed stream within the feedwell assembly with a flocculant reagent.

20. The method of claim 18, further comprising drawing the dilution liquor from beneath an accumulation of bitumen on a surface of the thickener.

* * * * *